United States Patent [19]

Chung

[11] Patent Number: 5,177,746
[45] Date of Patent: Jan. 5, 1993

[54] ERROR CORRECTION CIRCUIT USING A DESIGN BASED ON A NEURAL NETWORK MODEL

[75] Inventor: Ho-sun Chung, Taegu, Rep. of Korea

[73] Assignee: Samsung Electronics Co., Ltd., Kyunggi

[21] Appl. No.: 550,054

[22] Filed: Jul. 9, 1990

[30] Foreign Application Priority Data

Jun. 25, 1990 [KR] Rep. of Korea .................. 90-9406

[51] Int. Cl.$^5$ .............................................. G06F 11/08
[52] U.S. Cl. ........................................ 371/37.1; 395/27
[58] Field of Search ............................ 395/27, 24, 22; 371/37.1

[56] References Cited

U.S. PATENT DOCUMENTS

| | | | |
|---|---|---|---|
| 4,988,891 | 1/1991 | Mashiko | 307/201 |
| 5,034,918 | 7/1991 | Jeong | 395/24 |
| 5,047,655 | 9/1991 | Chambost et al. | 307/201 |

OTHER PUBLICATIONS

Kwon et al., Implementation of a Programmable Artificial Neuron Using Discrete Logic, 1989 (no month available).

Eberhardt et al., Design of Parallel Hardware Neural Network Systems From Custom Analog VLSI 'Building Block' Chips, Jun. 1989.

Bloomer et al., A Preprogrammed Artificial Neural Network in Signal Processing of IEEE Custon IC, May 1990.

Graf et al., VLSI Implementation of a Neural Network Model, 1988 (no month available).

*Primary Examiner*—Robert W. Beausoliel
*Assistant Examiner*—Allen M. Lo
*Attorney, Agent, or Firm*—Cushman, Darby & Cushman

[57] ABSTRACT

An error correction circuit is provided which uses NMOS and PMOS synapses to form neural network type responses to a coded multi-bit input. Use of MOS technology logic in error correction circuits allows such devices to be easily interfaced with other like technology circuits without the need to use distinct interface logic as with conventional error correction circuitry.

4 Claims, 2 Drawing Sheets

ERROR CORRECTION CIRCUIT USING A DESIGN BASED ON A NEURAL NETWORK MODEL

BACKGROUND OF THE INVENTION

1. Field of the Invention

This invention relates to an error correction circuit and more particularly to an error correction circuit which is based on a neural network model.

2. Background of the Invention

A data processing system made of conventional logic circuits is getting bigger in size and more complex in its arrangement of components. As a result, increasing circuit complexity creates unexpected problems and rising manufacturing costs.

In addition, the need to improve accuracy and reliability of every block in the system or its respective subsystems, demands that techniques for providing error correction be included. However, systems based on simple logic circuits have performance limitations due to inherent property characteristics of logic gates.

To overcome such limitations of logic circuit technologies a system design based on the concept of a neural network model has been actively studied.

An error correcting system based on neural network principles is shown in FIG. 1. This system was presented in the IEEE first annual international conference on neural networks in June 1987, which has a reference number of IEEE catalog #87TH0191-7, by Yoshiyasu Takefuji, Paul Hollis, Yoon Pin Foo, and Yong B. Cho.

The error correcting system presented at the above conference uses the concept of neural network principles, based on the Hopfield model, and discloses a circuit which performs significantly faster than prior error correcting systems.

However, since the circuit by Yoshiyasu Takefuji et al. uses operational amplifiers as neurons and a passive resistor element network to form synapses, VLSI implementation is quite limited. The reason being that on a semiconductor integrated circuit, a resistor element network has high power consumption and thus hinders manufacturing of a high integration circuit design.

Furthermore, the above circuit is further inadequate since it requires additional interfacing circuitry added whenever a digital system based on NMOS and CMOS technologies is coupled thereto.

SUMMARY OF THE INVENTION

Accordingly, it is an object to provide an error correction circuit having a design which is based on neural network principles and which uses MOS transistors formed on semiconductor VLSI logic.

It is another object to provide an error correction circuit which is directly connectable to conventional NMOS and CMOS digital system technology without requiring additional interface logic.

In achieving the above objects, the present invention is characterized in that the circuit comprises:
n neurons;
$2^k$ inverters;
a plurality of first synapses;
a plurality of second synapses;
a plurality of biasing synapses;
a plurality of third synapses; and
n transmitting gates.

The neurons are buffer amplifiers in which two CMOS inverters are connected in cascade. A synapse for transferring an excitatory state includes a PMOS transistor, and a synapse for transferring an inhibitory state includes a NMOS transistor.

The connecting strength of synapses is determined by the geometrical aspect ratio W/L of each respective transistor and corresponds to the ratio of a transistor's channel width to its channel length.

In the present invention, the error correction circuit is made using CMOS technology and thus designed to be directly interfaceable to other CMOS and related technologies without the use of additional interface logic.

BRIEF DESCRIPTION OF THE DRAWINGS

The above objects and other advantages of the present invention will become more apparent by describing the preferred embodiment of the present invention with reference to the attached drawings, in which.

DESCRIPTION OF THE PREFERRED EMBODIMENTS

In error correcting circuits, an (n,k) code word represents k actual data bits and n-k check bits. That is, the codeword is n bits long and contains k actual data bits. Generally, an (n,k) code can generate all $2^k$ codes by using the following polynomial generating equation. The equation is $$C(X) = D(X) * G(X)$$

where, C(X) is a codeword polynomial of the degree lower than n−1,

D(X) is a data polynomial of the degree lower than k−1, and

G(X) is a generating polynomial of the (n−k) th degree.

Thus, encoding the data polynomial D(X) means getting the codeword polynomial C(X) from D(X) multiplied by G(X).

In a 1 bit error correction circuit of (7,4) codewords, when the generating polynomial of $G(X)=X^3+X+1$ is given to code a 4 bit data string as a (7,4) codeword, the following (7,4) codewords shown in Table 1 are obtained.

TABLE 1

| Data bits | | | | D(X) | G(X) | C(X) = D(X) · G(X) | | | | | | |
|---|---|---|---|---|---|---|---|---|---|---|---|---|
| $X_3$ | $X_2$ | $X_1$ | $X_0$ | | | $X_6$ | $X_5$ | $X_4$ | $X_3$ | $X_2$ | $X_1$ | $X_0$ |
| 0 | 0 | 0 | 0 | | | 0 | 0 | 0 | 0 | 0 | 0 | 0 |
| 0 | 0 | 0 | 1 | 1 | | 0 | 0 | 0 | 1 | 0 | 1 | 1 |
| 0 | 0 | 1 | 0 | X | | 0 | 0 | 1 | 0 | 1 | 1 | 0 |
| 0 | 0 | 1 | 1 | X+1 | | 0 | 0 | 1 | 1 | 1 | 0 | 1 |

TABLE 1-continued

| Data bits | | | | D(X) | G(X) | C(X) = D(X) · G(X) | | | | | | |
|---|---|---|---|---|---|---|---|---|---|---|---|---|
| $X_3$ | $X_2$ | $X_1$ | $X_0$ | | | $X_6$ | $X_5$ | $X_4$ | $X_3$ | $X_2$ | $X_1$ | $X_0$ |
| 0 | 1 | 0 | 0 | $X^2$ | | 0 | 1 | 0 | 0 | 1 | 1 | 1 |
| 0 | 1 | 0 | 1 | $X^2$  +1 | | 0 | 1 | 0 | 1 | 1 | 0 | 0 |
| 0 | 1 | 1 | 0 | $X^2+X$ | $X^3+X+1$ | 0 | 1 | 1 | 0 | 0 | 0 | 1 |
| 0 | 1 | 1 | 1 | $X^2+X+1$ | | 0 | 1 | 1 | 1 | 0 | 1 | 0 |
| 1 | 0 | 0 | 0 | $X^3$ | | 1 | 0 | 0 | 0 | 1 | 0 | 1 |
| 1 | 0 | 0 | 1 | $X^3$  +1 | | 1 | 0 | 0 | 1 | 1 | 1 | 0 |
| 1 | 0 | 1 | 0 | $X^3$  +X | | 1 | 0 | 1 | 0 | 0 | 1 | 1 |
| 1 | 0 | 1 | 1 | $X^3$  +X+1 | | 1 | 0 | 1 | 1 | 0 | 0 | 0 |
| 1 | 1 | 0 | 0 | $X^3+X^2$ | | 1 | 1 | 0 | 0 | 0 | 1 | 0 |
| 1 | 1 | 0 | 1 | $X^3+X^2$  +1 | | 1 | 1 | 0 | 1 | 0 | 0 | 1 |
| 1 | 1 | 1 | 0 | $X^3+X^2+X$ | | 1 | 1 | 1 | 0 | 1 | 0 | 0 |
| 1 | 1 | 1 | 1 | $X^3+X^2+X+1$ | | 1 | 1 | 1 | 1 | 1 | 1 | 1 |

As shown in Table 1, when only 1 bit errors can occur, the number of possible errors for each coded 4 bit data string equals 7. For example, code pattern "1011000" is explained in detail in Table 2.

TABLE 2

| The error states of code pattern "1011000" |
|---|
| 0011000 |
| 1111000 |
| 1001000 |
| 1010000 |
| 1011100 |
| 1011010 |
| 1011001 |

As shown in Table 2, each 1 bit error state of "1011000" does not match any of the other codewords. In connection with the smallest Hamming distance, the number of check bits is calculated by using the following equation:

$$Df \geq 2t+1$$

where, t is the number of corrected bits, and
Df is the number of check bits.

Figure 1:
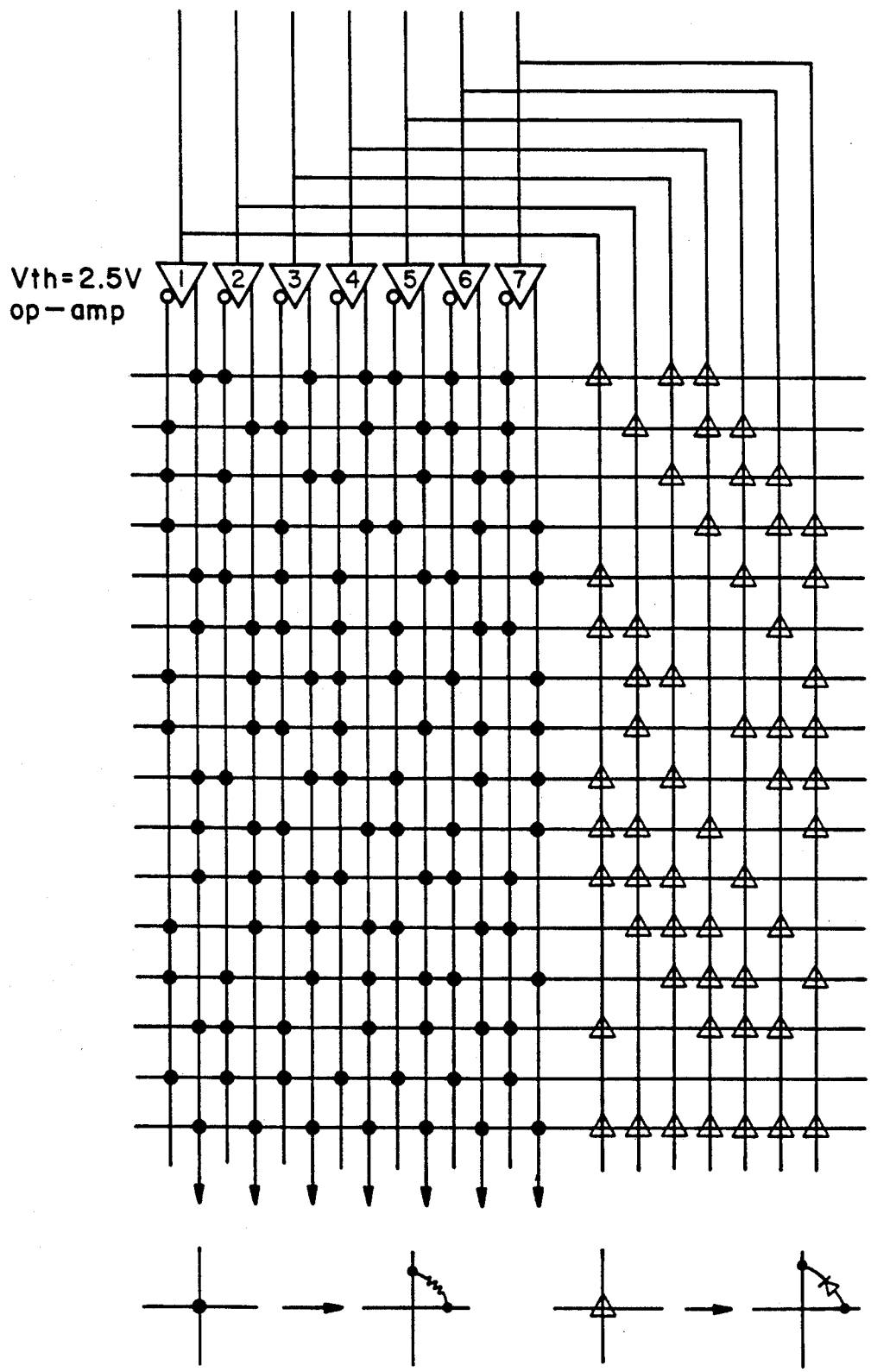
FIG. 1 is a circuit diagram of a preferred embodiment showing a conventional error correction circuit having a design based on neural network principles.
Figure 2:
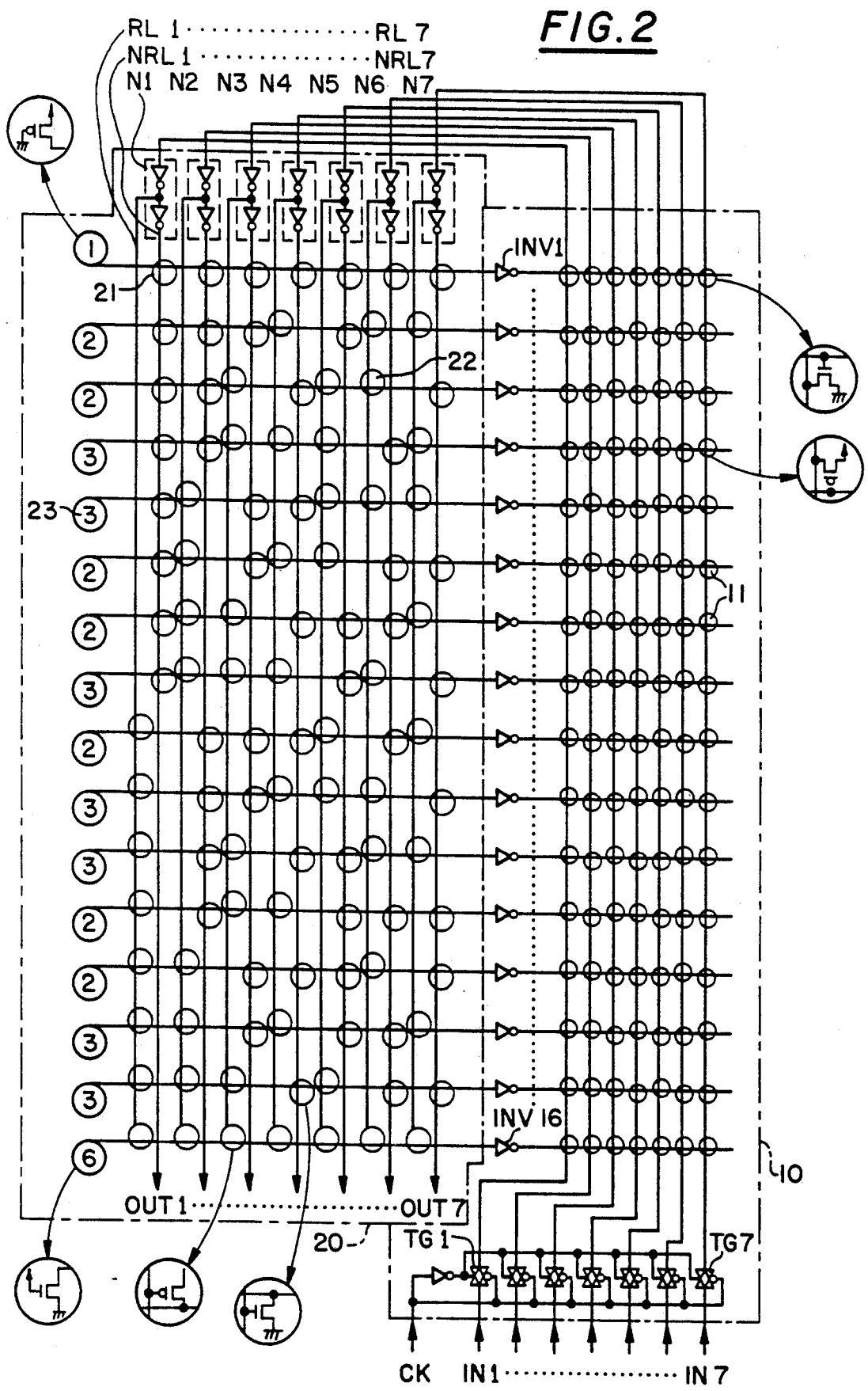
FIG. 2 is a circuit diagram of a preferred embodiment showing an error correction circuit according to the present invention.

In FIG. 2, a 1 bit error correction circuit is shown as a (7,4) codeword according to the present invention.

Into the right bottom part on FIG. 2, an input is entered, and then outputted to the left bottom. The right portion is the vector unit portion 10, and the left portion is the storage unit portion 20.

Between these two portions, feedback via inverters INV1 to INV16 is carried out and the signal amplified.

Transmitting gates TG1 to TG7 are used in the input portion so as to control the input signal in response to clock signal CK. This is to prevent the feedback signal and the input signal from becoming superposed.

The signal passed through transmitting gates TG1 to TG7 then freely passes to vector unit portion 10 and then fed through first and second synapses 21 and 22 of storage unit portion 20.

Storage unit portion 20 comprises 7 neurons N1 to N7, first and second synapses 21 and 22, and biasing synapses 23.

The respective neurons N1 to N7, each of which consist of two interconnected CMOS inverters, have as their output lines noninverted output lines NRL1 to NRL7 and inverted output lines RL1 to RL7.

Vector unit portion 10 comprises 16 inverters INV1 to INV16 and third synapse 11. The NMOS transistors (i.e., first synapses 21) are selectively disposed at respective intersections of positions corresponding to a "0" value for all 16 codewords shown in Table 1 at the intersections of the noninverted output lines and the input lines of the inverters.

Second synapses 21 (i.e., PMOS transistors) are selectively disposed at respective intersections of positions corresponding to a "1" value.

If the noninverted output lines connected to the gates of NMOS transistors are at a "HIGH" state, the respective NMOS transistors are turned on and the inhibitory state is set (i.e., Vss or ground potential), in unit connecting strength to the input line to which the drain is connected.

If the inverted output lines connected to the gates of the PMOS transistors are in a "LOW" state, the PMOS transistors are turned on and the excitatory state is set (i.e., Vcc or supplying voltage), in unit connecting strength to the input line to which the drain is connected.

The unit connecting strength (i.e., the value of W/L) of a PMOS transistor is 6/2 ($\mu m/\mu m$) and of an NMOS transistor is 2/2 ($\mu m/\mu m$).

When the excitatory strength is equal to the inhibitory strength, the unit connecting strength of the excitatory state (i.e., the conductance of the PMOS transistor) is superior to the conductance of the NMOS transistor and so the state is recognized as an excitatory state.

Furthermore, biasing synapses 23 (i.e., NMOS and PMOS transistors) are connected to respective input lines of the inverters. Biasing synapses 23 have a connecting strength value determined by subtracting the number of bits to be corrected from the number of second synapses 22 connected to the respective input lines of the particular biasing synapse.

In the case of code pattern "0001011" with 1 bit error correction, the biasing synapse connected to the input line of the second inverter INV2 has 3 PMOS transistors. Hence, the NMOS biasing transistor is included to transfer an inhibitory state with a connecting strength of $3-1=2$.

This NMOS transistor has a geometrical aspect ratio of W/L=2.(2/2) ($\mu m/\mu m$).

The biasing synapse connected to the output line of first inverter INV1 has value "0" since the number of PMOS transistors is zero and error correction is for 1 bit error. Therefore, a transistor is included to transfer the excitatory state with a connecting strength of $0-1=1$.

Biasing synapses 23 provide only the output line of the inverter which codeword is the most similar pattern to the synapse pattern connected to the input line among the 16 codewords and sets that to an excitatory state.

Hence, the output line will have value "0" and the other 15 output lines, inverted and set to inhibitory states will yield "1" states.

More specifically, biasing synapses 23 cause the input lines of INV1-16 to be high or lo in accordance with the following rules:

1. If $(A-B)+C>D$,
   THEN TRANSFER INHIBITORY STATE
2. IF $(A-B)+C \leftarrow D$,
   THEN TRANSFER EXCITATORY STATE where A is the number of PMOS (second) synapses in the word which should be transferring an excitatory state, B is the number of PMOS (second) synapses in the word which actually are transferring an excitatory state, C is the number of NMOS (first) synapses in the word which actually are transferring an inhibitory state, and D is the number of bits the code corrects.

The implementation of these rules is accomplished by connecting the biasing synapses with a connecting strength equal to:

(#of PMOS (second) synapses in a word)—(#of bits the code corrects).

In vector unit portion 10, the self feedback pattern is detected and the signal outputted as the final output.

In third synapse 11 of vector unit 10, to transfer the inhibitory state as the unit connecting strength at each intersection corresponding to the respective "0" bit values of the above codeword among intersections of the input lines of the neurons of N1 to N7 and the output lines of the inverters of INV1 to INV7, to the interconnecting input line, and the excitatory state having $2^{4-1}=8$ as the connecting strength at each intersection corresponding to the respective "1" bit values, NMOS and PMOS transistors are used.

Here, the geometrical aspect ratio of each NMOS transistor is W/L=2/2 ($\mu m/\mu m$) and the geometrical aspect ratio of each PMOS transistor is W/L=48/2 ($\mu m/\mu m$). The reason is that only one has "0" value while the other 15 all have value "1" as they pass through a respective inverter.

In this particular example, a PMOS transistor and 8 NMOS transistors can be turned on. After this state, to yield a value "1", the geometrical aspect ratio of the PMOS transistor should be W/L=8(6/2) ($\mu m/\mu m$). That is, when the connecting strength of the excitation is equal to that of the inhibition, the excitatory state is eminently activated.

The following Table 3 shows the output results as a function of input data for the error correction circuit of FIG. 2.

TABLE 3

| INPUT DATA | | | |
|---|---|---|---|
| OUTPUT DATA | | | |
| 0000000 | 0001011 | 0010110 | 0011101 |
| 0000001 | 0001010 | 0010111 | 0011100 |
| 0000010 | 0001001 | 0010110 | 0011111 |
| 0000100 | 0001111 | 0010010 | 0011001 |
| 0001000 | 0000011 | 0011110 | 0010101 |
| 0010000 | 0011011 | 0000110 | 0001101 |
| 0100000 | 0101011 | 0110110 | 0111101 |
| 1000000 | 1001011 | 1010110 | 1011101 |
| 0000000 | 0001011 | 0010110 | 0011101 |
| 0100111 | 0101100 | 0110001 | 0111010 |
| 0100110 | 0101101 | 0110000 | 0111011 |
| 0100101 | 0101010 | 0110011 | 0111000 |
| 0100011 | 0101000 | 0110101 | 0111110 |
| 0101111 | 0100100 | 0111001 | 0110010 |
| 0110111 | 0111100 | 0100001 | 0101010 |
| 0000111 | 0001100 | 0010001 | 0011010 |
| 1100111 | 1101100 | 1110001 | 1111010 |
| 0100111 | 0101100 | 0110001 | 0111010 |
| 1000101 | 1001110 | 1010011 | 1011000 |
| 1000100 | 1001111 | 1010010 | 1011001 |
| 1000111 | 1001100 | 1010001 | 1011010 |
| 1000001 | 1001010 | 1010111 | 1011100 |
| 1001101 | 1000110 | 1011011 | 1010000 |
| 1010101 | 1011110 | 1000011 | 1001000 |
| 1100101 | 1101110 | 1110011 | 1111000 |
| 0000101 | 0001110 | 0010011 | 0011000 |
| 0000000 | 1001110 | 1010011 | 1011000 |
| 1100010 | 1101001 | 1110100 | 1111111 |
| 1100011 | 1101000 | 1110101 | 1111110 |
| 1100000 | 1101011 | 1110110 | 1111101 |
| 1100110 | 1101101 | 1110000 | 1111011 |
| 1101010 | 1100001 | 1111100 | 1110111 |
| 1110010 | 1111001 | 1100100 | 1101111 |
| 1000010 | 1001001 | 1010100 | 1011111 |
| 0100010 | 0101001 | 0110100 | 0111111 |
| 1100010 | 1101001 | 1110100 | 1111111 |

Therefore, the present invention uses NMOS and PMOS transistors in a neural network based model and includes CMOS buffer amplifiers as neurons, to easily achieve VLSI implementation and easy interfacing to like technology circuits.

What is claimed is:

1. An error correction circuit for error correcting a code with length n, $2^k$ codewords, and an error correction capability of c bits, said error correction circuit comprising:

n transmitting gates for receiving an n-bit coded signal and transmitting said n-bit coded signal in response to an external clock signal;

vector unit synapse means for receiving said n-bit transmitted coded signal along n input lines, and for receiving $2^k$ inverter output signals along $2^k$ inverted lines, said n input lines and said $2^k$ inverter output signals forming synaptic interconnections therebetween;

n input neurons each respectively coupled to one of said n input lines, each neuron being responsive to a combination of active synapses of said vector unit synapse means connected to the corresponding input line, for generating n inverted signals and n non-inverted signals; and storage unit synapse means coupled to said n neurons and comprising:

n inverted lines and n non-inverted lines each for respectively receiving a corresponding one of said n inverted signals and said n non-inverted signals;

$2^k$ bias lines, each corresponding to one of said $2^k$ codewords;

a plurality of bias synapse means, each coupled to a respective one of said $2^k$ bias lines, for providing either inhibitory or excitatory state to said bias lines with a predetermined connecting strength;

a plurality of first synapse means coupled between each of said bias lines and each of said non-inverted lines corresponding to the bits where there is a 0 in the codeword which corresponds to said each bias line, for selectively providing inhibitory state with a first connecting strength to said each bias line, depending on the value of said non-inverted signal on said each non-inverted line;

a plurality of second synapse means coupled between each of said bias lines and each of said inverted lines corresponding to the bits where there is a 1 in the codeword which corresponds to said each bias line, for selectively providing excitatory state with a second connecting strength to said each bias line, depending on the value of said inverted signal on said each inverted line;

$2^k$ inverters, each of said inverters coupled to receive a respective one of said $2^k$ bias lines as an input signal, and provide an output signal to a respective one of said $2^k$ inverted lines, each of said $2^k$ inverters corresponding to the codeword of its respective bias line, wherein each of said plurality of bias synapse means has either an excitatory or an inhibitory state and a predetermined connecting strength such that when said received n-bit signal differs from one of said codewords by less than or equal to the number of bits of the error correction capability c, the inverter corresponding to said one codeword outputs a signal opposite of the signal outputted by the rest of said inverters;

and n output lines coupled to said n non-inverted lines, for generating an n-bit error corrected signal.

2. The error correction circuit of claim 1, wherein each of said first synapses is an NMOS transistor and each of said second synapses is a PMOS transistor.

3. The error correction circuit of claim 1, wherein each of said connecting strength is determined by the geometrical aspect ratio (W/L) of the particular transistor forming a synapse.

4. The error correction circuit of claim 1, wherein each of said n input neurons comprises two series connected CMOS inverters.

* * * * *